United States Patent [19]

Moore

[11] E Re. 29,837

[45] Reissued Nov. 14, 1978

[54] ELECTROMAGNETIC OVEN SYSTEM FOR AUTOMATICALLY HEATING VARIABLE NUMBERS AND SIZES OF FOOD ITEMS OR THE LIKE

[75] Inventor: Donald G. Moore, Glencoe, Ill.

[73] Assignee: Chemetron Corporation, Chicago, Ill.

[21] Appl. No.: 670,888

[22] Filed: Mar. 26, 1976

Related U.S. Patent Documents

Reissue of:

[64] Patent No.: 3,854,022
Issued: Dec. 10, 1974
Appl. No.: 380,187
Filed: Jul. 18, 1973

U.S. Applications:

[63] Continuation-in-part of Ser. No. 300,763, Oct. 25, 1972, Pat. No. 3,936,626.

[51] Int. Cl.[2] ..... H05B 9/06

[52] U.S. Cl. ..... 219/10.55 B; 219/10.55 E; 324/224; 335/146; 335/208; 340/597

[58] Field of Search ..... 219/10.55 B, 10.55 E, 219/10.55 F, 10.55 M, 10.55 R; 335/146, 208; 324/34 TE; 426/241, 243

[56] References Cited

U.S. PATENT DOCUMENTS

| | | | |
|---|---|---|---|
| 2,540,527 | 2/1951 | Ingels | 340/228 F |
| 3,292,124 | 12/1966 | Legvold | 335/146 |
| 3,523,170 | 8/1970 | Boehon | 219/10.55 B |
| 3,534,306 | 10/1970 | Watrous et al. | 335/146 |
| 3,602,851 | 8/1971 | Wiegand | 335/146 |
| 3,649,936 | 3/1972 | Masuda et al. | 335/208 |
| 3,662,140 | 5/1972 | Jones et al. | 219/10.55 B |
| 3,746,824 | 7/1973 | Prucha | 219/10.55 B |
| 3,783,221 | 1/1974 | Soulien | 219/10.55 A |

FOREIGN PATENT DOCUMENTS

| | | | |
|---|---|---|---|
| 1,215,369 | 12/1970 | United Kingdom | 219/10.55 A |

*Primary Examiner*—Bruce A. Reynolds
*Attorney, Agent, or Firm*—Vincent G. Gioia

[57] ABSTRACT

An electromagnetic oven is provided with a control system comprising a sensor located within the oven, a detector coupled to the sensor, and control means responsive to signals from the detector. In one embodiment, the control means activate a counter which, upon a predetermined number of operations, signals a condition of the load within the oven and may modify subsequent energy inputs to the load.

43 Claims, 9 Drawing Figures

FIG. 4B
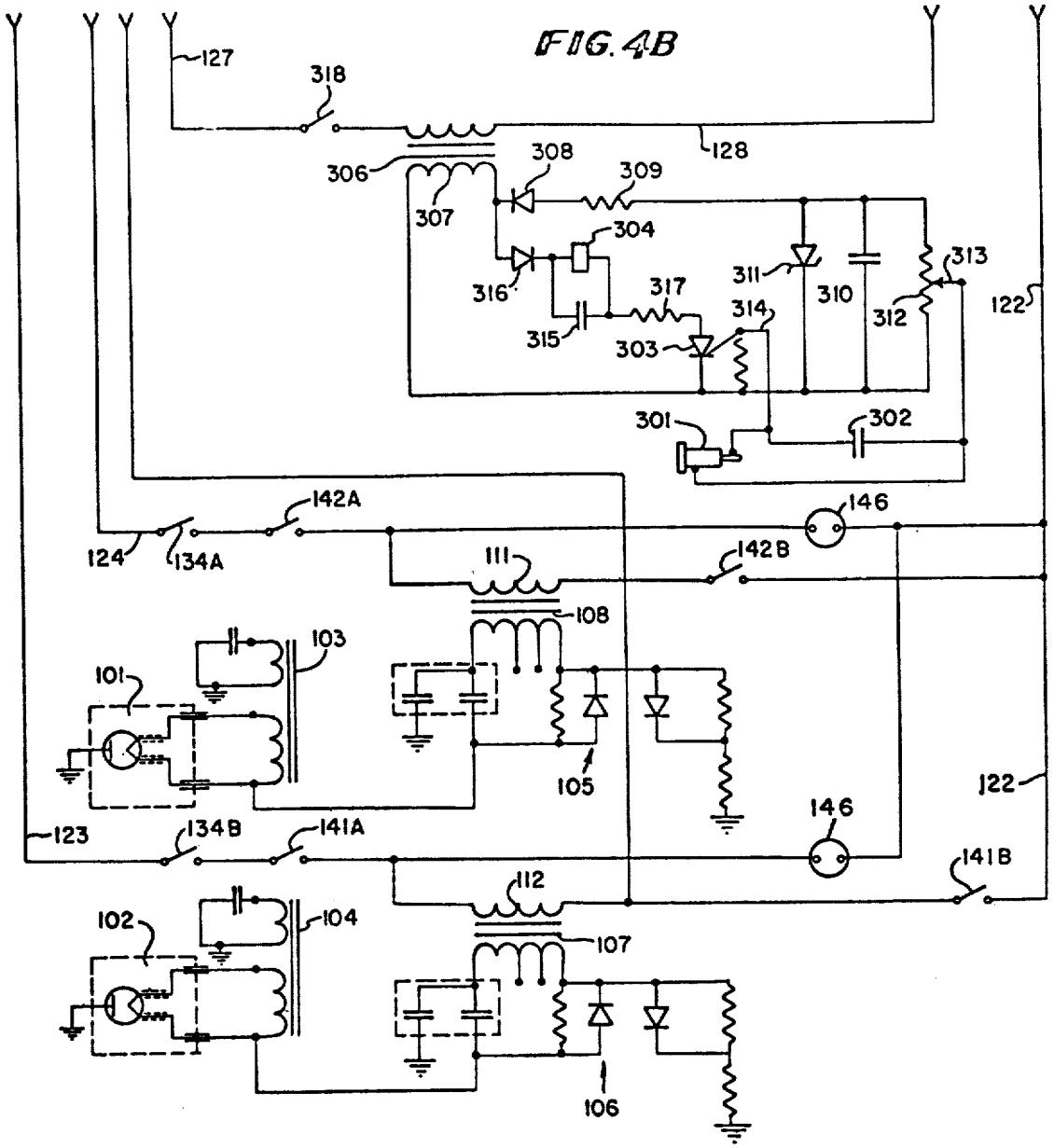
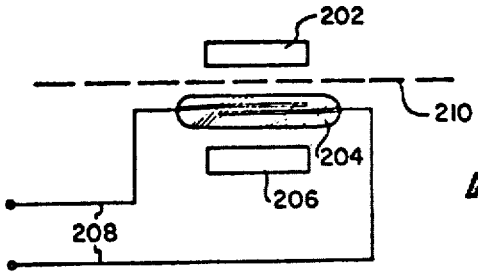
FIG. 5

ELECTROMAGNETIC OVEN SYSTEM FOR AUTOMATICALLY HEATING VARIABLE NUMBERS AND SIZES OF FOOD ITEMS OR THE LIKE

Matter enclosed in heavy brackets [ ] appears in the original patent but forms no part of this reissue specification; matter printed in italics indicates the additions made by reissue.

CROSS-REFERENCE TO RELATED APPLICATIONS

[The present application is a continuation-in-part of] *The present application is a reissue application of U.S. Pat. No. 3,854,022 issued from a continuation in part of* application Ser. No. 300,763, filed on Oct. 15, 1972, *now U.S. Pat. No. 3,936,626.*

The details of a door-actuated shielding mechanism which may be used in conjunction with the present invention are disclosed in application Ser. No. 380,188 filed on the same day as [the present] *said continuation-in-part* application by the present inventor and William E. Leyers, *now U.S. Pat. No. 3,854,021.* A detailed explanation of how the present invention may be used to simultaneously heat different food items to differing temperatures is presented in application Ser. No. 380,487 filed on the same day as [the present] *said continuation-in-part* application by the present inventor, *now U.S. Pat. No. 3,935,415.* The present application and all of the above applications are assigned to a common assignee.

BACKGROUND OF THE INVENTION

In heating substances of various types, it is necessary to control the heat generating element to prevent an excessive rise in temperature. This control may be by way of an interval timer which activates the heating element for a predetermined period. Alternatively, the heating element may be controlled by a temperature responsive unit which reacts to the temperature of the load environment such as the air within an oven or the heating plate on an appliance.

The use of a sensing element responsive to the temperature of a heating plate to control the heat input to an appliance is taught in U.S. Pat. No. 3,328,561. That patent describes a ferrite element which is normally attracted by a permanent magnet except when the ferrite is heated to a temperature exceeding its "Curie Point." In this device, at the control point, the temperature of the ferrite must necessarily be near the temperature of the heating plate. A ferrite element would, therefore, appear to be unsuitable for use to control a microwave oven since the electromagnetic energy heats the load without producing a corresponding increase in temperature in the air in the oven. Electromagnetic ovens do not get hot the way conventional ovens do and they cannot be controlled by a conventional thermostat. According to the usual practice, a microwave oven is controlled by a timer in which the size of the load, is character, water content, initial temperature and the like are considered and, based on experience, an appropriate setting is selected. This, however, requires great skill or experience to achieve dependably satisfactory heating. There remains, therefore, the need for a means to control a microwave oven which is responsive to the condition of the load in the oven.

BRIEF SUMMARY OF THE INVENTION

It is an object of this invention, therefore, to provide a control system for an electromagnetic oven and a method for its operation.

A further object of this invention is the provision of a control system which automatically compensates for the characteristics and initial temperature of the oven load.

Another object of the present invention is provision of a method for supplying multiple heating intervals, preferably automatically adjusted, in accordance with the particular requirements of the oven load.

A still further object of the invention is the provision of a control system which requires no timer for its operation.

Still other objects of the invention will become apparent from the following description and drawings.

These objects are achieved through the provision of a control system for an electromagnetic oven, said control system comprising an energy sensor having a property that changes in response to absorption of electromagnetic field within said oven, detector means responsive to the property of said sensor and for generating a signal whose state reflects said property and thereby indicates whether said sensor has absorbed more or less than a predetermined amount of energy, and oven control means for deactivating said oven when said signal indicates that said sensor has absorbed more than said predetermined amount of energy. In a preferred embodiment, the sensor has ferromagnetic properties at low temperatures and paramagnetic properties at an elevated temperature and possesses the ability to convert electromagnetic energy into heat energy. Desirably, the detector means is magnetically coupled to the sensor to generate a signal whose state indicates whether said sensor has ferromagnetic or paramagnetic properties.

In one embodiment the heating system comprises a cavity into which the load, that is, the articles to be heated and the energy sensor, is inserted, guide means in the cavity and an article carrier to be located in a predetermined position in the cavity by the guide means. The invention also contemplates a method of heating with microwave energy comprising the steps of conditioning a load, i.e., the articles to be heated and a sensor responsive to microwave radiation, preferably to a uniform low temperature, placing the conditioned load in an oven to couple the sensor to a detector located outside the oven cavity, and supplying energy to the load until the sensor activates the detector unit.

BRIEF DESCRIPTION OF THE DRAWINGS

For a better understanding of the invention, frequent references will be made to the drawings wherein:

FIGS. 4A and 4B, when assembled with FIG. 4A directly above FIG. 4B, form a complete schematic diagram of a microwave oven control system that is designed in accordance with the present invention;

FIG. 5 is a partly schematic and partly block diagram of a ferrite sensor, magnet, and reed switch detector combination that may be used to control the operation of the oven shown in FIG. 1;

DETAILED DESCRIPTION OF THE PREFERRED EMBODIMENT

Figure 1:
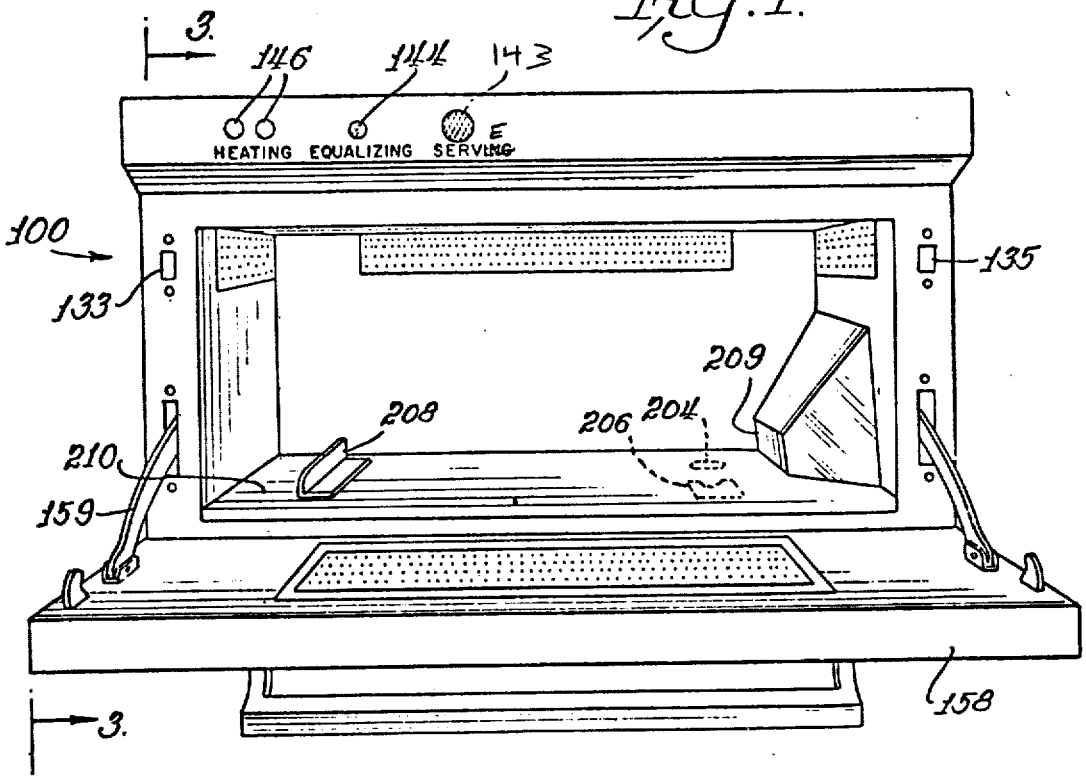
FIG. 1 is a front perspective view of a microwave oven designed in accordance with the teachings of the present invention.

Shown in FIG. 1 is an oven 100, a model 70/80 MenuMaster (registered trademark) microwave oven sold by the Atherton Division of Litton Systems, Inc., Minneapolis, Minn., modified to be suitable for the practice of the invention. Equivalent electromagnetic heating systems can be used as well.

Figure 8:
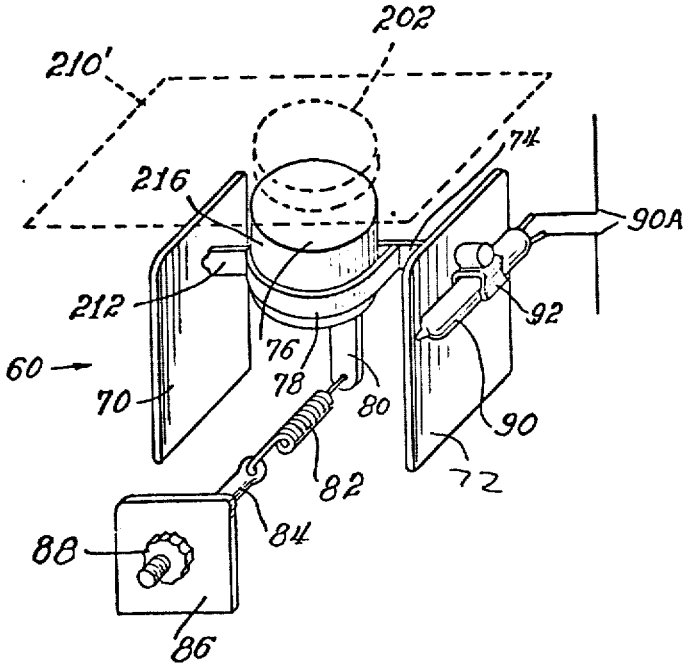
FIG. 8 is an oblique view of an alternate control comprising a pivotally mounted magnet and a mercury switch detector assembly that may be used in the oven shown in FIG. 1.

The floor 210 of the oven 100 for this invention is constructed from a non-magnetic, electrically conductive material such as type 304 stainless steel or the like. Beneath the conductive floor 210 of the oven 100 there is mounted a detector assembly comprising a permanent magnet 206 and a reed-switch detector 204 which are shown in detail in FIGS. 5–7. Alternatively, the detector assembly may comprise a permanent-magnet and a mercury switch detector which are shown in FIG. 8. Guide means 208 and 209 are provided to position a tray within the oven so that a ferrite sensor that is carried by the tray may be coupled in operative association with the detector.

Figure 2:
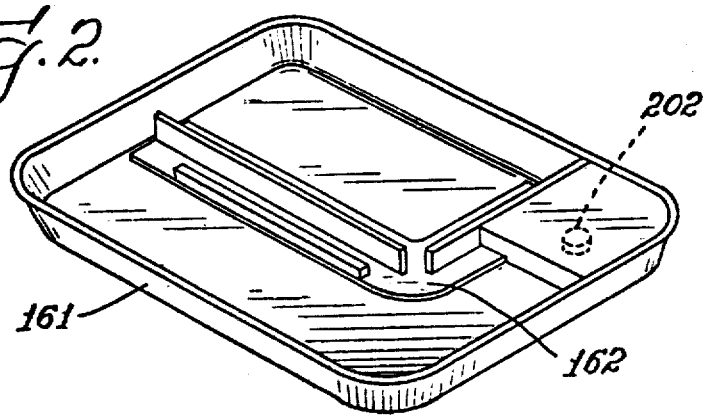
FIG. 2 is an isometric view of a tray designed for use in the oven shown in FIG. 1, and provided with a ferrite oven control sensor.

The oven 100 is designed to accept food items which are carried by a serving tray 161 (FIG. 2). The tray 161 is of generally conventional design but carries a ferrite sensor 202 comprising a torroid that is constructed from a ferrite material having a relatively low Curie point. For example, a suitable sensor is the FERROXCUBE torroid 3-E which has a Curie point about 125° and may be purchased from the Ferroxcube Corporation, Saugerties, N.Y. The sensor rests in a shallow aluminum cup that has no top.

Food items which are not to be heated are placed within a rectangular region of the tray that is defined by an electrically conductive strip 162, and food items which are to be heated are placed within the remaining region of the tray 161. A box-like electrically conductive shield (not shown) engages the L-shaped strip 162 and protects the food items which are not to be heated from the electromagnetic energy that is developed within the oven 100.

Figure 3:
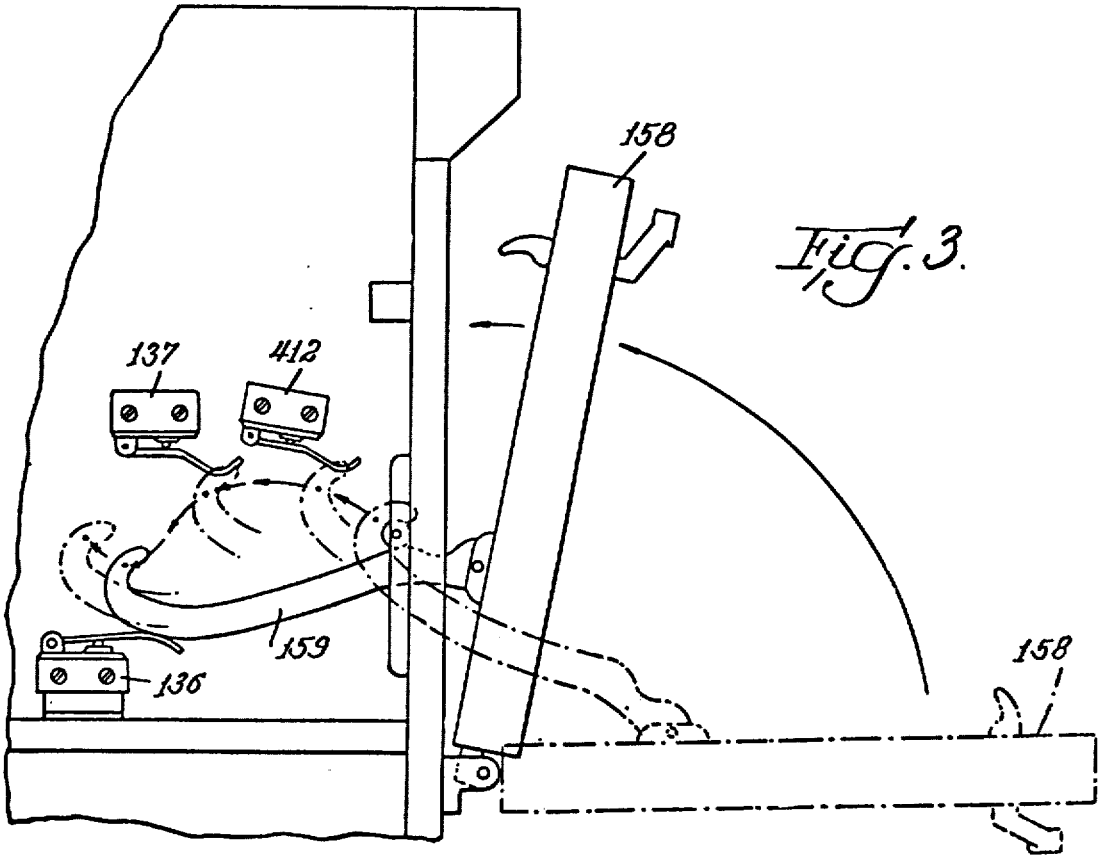
FIG. 3 is a left-hand side view of the oven shown in FIG. 1 with a portion of the oven side wall removed to reveal a series of switches that are momentarily actuated each time the oven door is fully opened and fully closed.

FIG. 3 is a view of the left-hand side of the oven 100 with the oven sidewall removed to show three switches 136, 137, and 412. Whenever the oven door 158 is closed, a lever 159 attached to the door 158 successively actuates in turn each of the switches 136, 137, and 412; actuation is in reverse sequence when the door is opened. These switches are actuated momentarily.

Figure 4A:
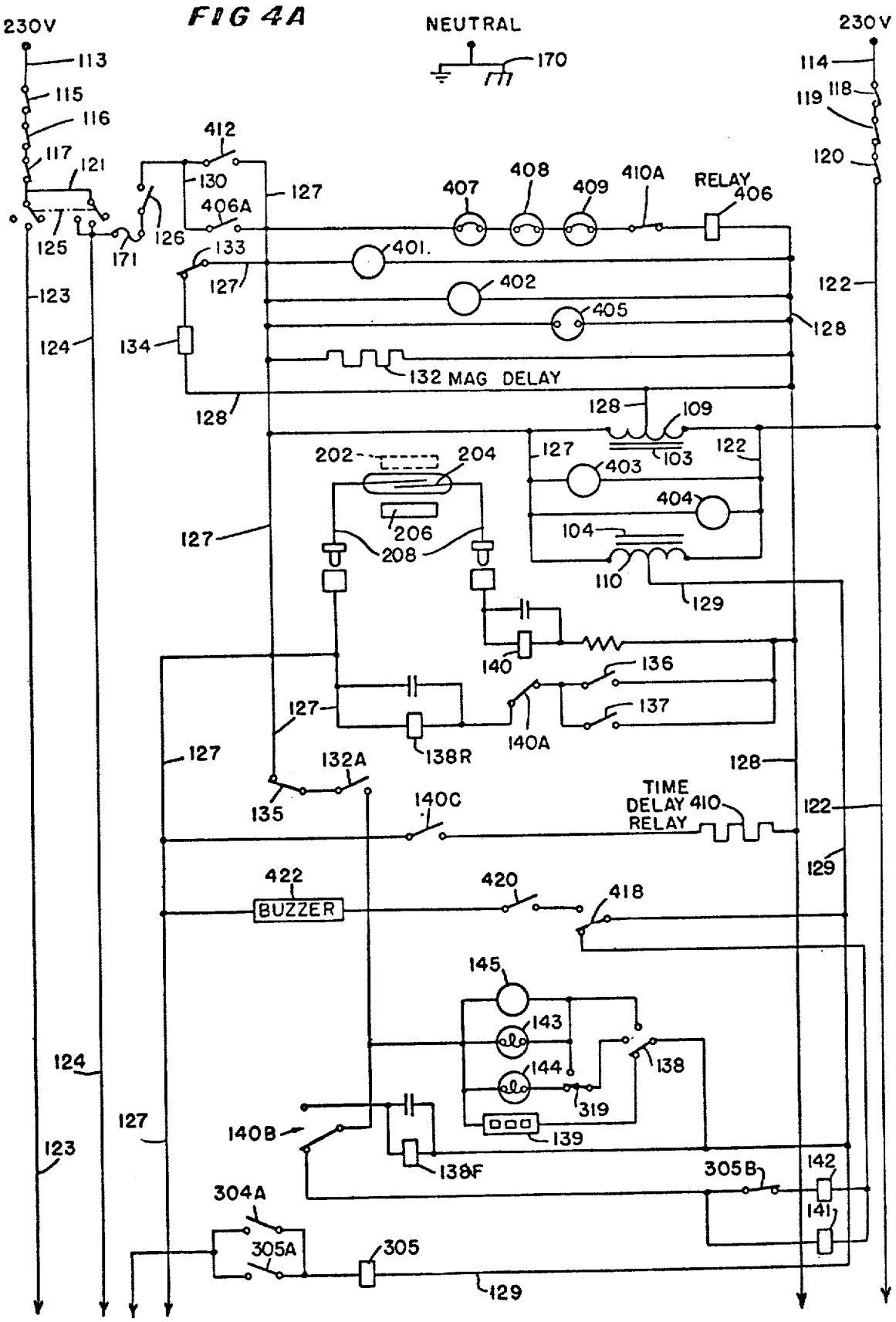
Figure 6:
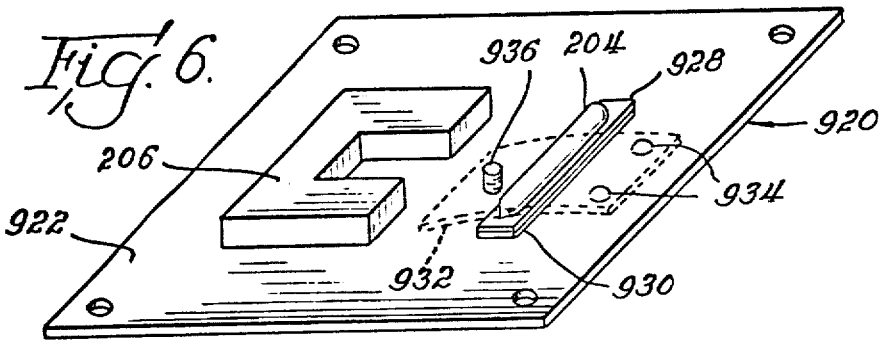
FIG. 6 is an oblique view of a magnet and detector assembly which includes a permanent magnet and a glass encapsulated reed switch.
Figure 7:
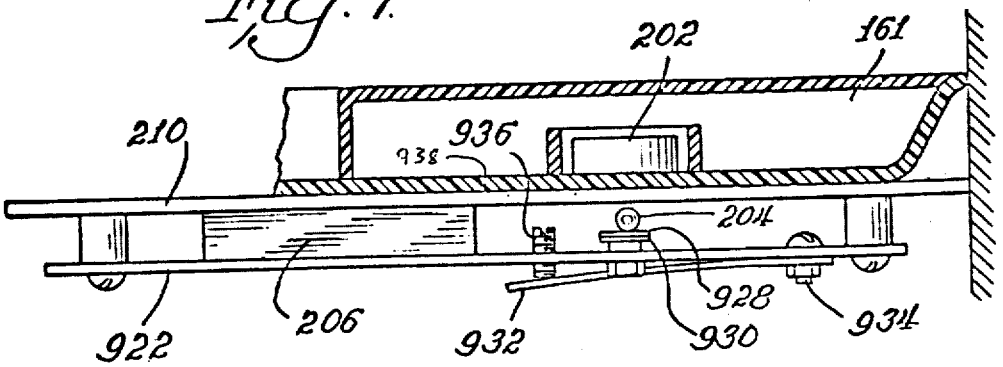
FIG. 7 is a sectional view of the assembly shown in FIG. 6 which illustrates the relative positions of the magnet, the reed-switch detector, and a tray-mounted ferrite sensor when a tray is present within the oven shown in FIG. 1.

FIGS. 6 and 7 of the drawings illustrate the structural details of the detector assembly which is shown schematically in FIG. 5 and which is identified generally as 920 in FIG. 6. The detector assembly 920 includes a non-magnetic or brass supporting plate 922 secured to the underside of the oven's conductive floor 210. A permanent magnet 206 is carried by the supporting plate 922. Spaced laterally from the permanent magnet 206 but within the influence of its magnetic field is a seald magnetic reed switch detector 204 such as reed switch model MSRR-2-185 sold by Hamlin, Incorporated, of Lake Mills, Wis. (53551) This reed-switch detector rests on a plastic plate 928 which, in turn, rests on a magnetically permeable field-focusing plate or element 930. The plates 928 to 930 are suitably mounted on the supporting plate 922, and the reed switch detector 204 is electrically connected by wires (not shown) to the oven control circuit as is shown in FIG. 4A. The reed-switch detector 204 is disposed in position to be operatively associated with the ferrite sensor 202 which is carried by a tray 161 when such a tray is present within the oven cavity.

The field-focusing element 930 tends to increase the allowable gap between the reed-switch detector 204 and the ferrite sensor 202. To adjust the sensitivity of the detector 204, there is provided an adjustable ferromagnetic and resilient element 932 secured to one end of the supporting plate 922 by a plurality of threaded fasteners 934. The element 932 underlies the poles of the magnet 206. A lead screw threadedly mounted in the supporting plate 922 bears against the free end of the element 932. By adjusting of the lead screw 936, the position of the element 932 relative to the magnet 206 can be controlled, and thus the sensitivity of the assembly 920 may be adjusted. The floor 210 may be provided with an aligned opening 938 above the lead or set screw 936 to permit adjustment of the position of the element 932.

When the ferrite sensor is either absent or above its Curie-point, the permanent magnet 206 causes the contacts of the reed-switch detector 204 to be closed. When, however, the cool ferrite sensor 202 is disposed in its proper position relative to the reed-switch detector 204 on insertion of a tray 161 into the oven cavity, the magnetic field of the permanent magnet 206 is sufficiently shunted and the reeds within the detector 204 are moved to their normal spaced position. Thus, when the ferrite sensor 202 becomes heated to its Curie-point the shunt provided by the ferrite sensor 202 is removed and the contacts of the detector 204 are again closed. The oven floor 210 in FIG. 7 is electrically conductive to prevent electromagnetic energy from reching the reed-switch detector 204. The detector of FIG. 8 requires that only the mercury switch 90 be so protected.

An alternate detector assembly 60 shown in FIG. 8 includes a pair of supporting brackets or arms 70 and 72 secured to some suitable base structure or support (not shown). A pivot arm 74 extends between and is pivotally mounted on the supports 70 and 72. A permanent magnet 76 illustrated as cylindrical in configuration is secured to a midpoint of the pivot arm 74 as by a fastening band or clamp 78 so that the upper end of the permanent magnet 76 is underlying the ferrite sensor 202 shown in dot-and-dash outline when a tray is disposed within the oven cavity. Due to the disposition of the upper end of the magnet 76 against the lower surface 210' of the oven bottom, effecient magnetic coupling is provided between the ferrite sensor 202 and the permanent magnet 76.

Since the permanent magnet 76 is eccentrically disposed with respect to the pivotal axis of the arm 74, an arm 80 is provided secured to the arm 74 and depending therefrom. The lower end of the arm 80 is connected to one end of a tension spring 82, the other end of which is connected to a lead screw 84 passing through a suitable support 86. A thumb screw 88 bearing against the support 86 and threadedly engaged with the free end of the lead screw 84 provides means for manually adjusting the resilient bias applied by the spring 82 to the arm 80. This bias is so adjusted that the counterclockwise moment about the pivotal axis of the arm 74 due to the off-center disposition of the permanent magnet 76 is substantially counterbalanced, although permitting the magnet 76 to occupy a normal position displaced downwardly somewhat from horizontal.

To provide means for controlling the heating cycle of the oven 100, the assembly 60 includes a mercury switch or capsule 90 secured to a projecting end of the pivot arm 74 by a bracket or clamp 92. The switch capsule 90 is one well known in the art and can include, for example, a body of mercury disposed within a sealed glass housing from one end of which extend a pair of electrically conductive terminal pins 90A. These pins are connected by conductors (not shown) to the on-off control for the oven 100.

In the normal condition of the detector assembly 60, the magnet 76 and the mercury switch 90 are disposed in a position set by tension spring 82 deflected slightly in a counterclockwise direction about the axis of the pivot arm 74 so that the terminal pins 90A of the mercury switch 90 are elevated with respect to the opposite end of this capsule. This means that the switch 90 is in an open circuit condition because the liquid mercury is not bridging the switch terminal pins 90A. When, however, a tray 161 is inserted into the oven 100 so that the ferrite sensor 102 is in the position illustrated in dot-and-dash outline in FIG. 8, the magnetic coupling between the members 202 and 76 moves the pivot arm 74 in a clockwise direction about its axis so that the switch 90 is also moved in a clockwise direction, and the end of the switch 90 containing the terminal pins 90A is displaced below the opposite end of this switch. The body of liquid mercury contained within the switch 90 moves into engagement with the interior ends of the terminal pins 90A and establishes an electrically conductive circuit between the pins 90A. This circuit prepares a control unit for the oven 100 to initiate a heating cycle.

As set forth above, the detector assembly 60 utilizes the attainment of the Curie point by the ferrite sensor as an indication that the heating cycle should be terminated. When the Curie point is exceeded, the ferrite sensor 202 changes from a ferromagnetic material to a paramagnetic material. This means that the magnetic force coupling the bodies 202 and 76 becomes substantially reduced, and the mass of the permanent magnet 76 is effective to pivot this magnetic member and the mercury switch 90 in a counterclockwise direction (FIG. 8) around the pivotal axis of the arm 74 so that electrical continuity between the terminal pins 90A is interrupted. This provides an indication to the controls for the oven 100 that the heating cycle is to be terminated. This interruption in continuity of the control circuit afforded by the displaced mercury switch 90 continues until such time as the ferrite body 26 cools below its Curie point or a new tray 161 is inserted into the cavity in place of the prior tray.

Either of the detector arrangements shown in FIGS. 5–7 and 8 may be used in constructing the present invention, and other equivalent arrangements may also be utilized. It should be noted at the onset that the reed-switch detector 204 opens its contacts when it detects a cold ferrite sensor, whereas the mercury switch 90 closes its contacts when it detects a cold ferrite sensor. Similarly, when the ferrite sensor 202 is removed from the oven or is heated to above its Curie point, the reed-switch detector 204 responds by closing its contacts whereas the mercury switch 90 responds by opening its contacts. The preferred embodiment of the invention is described functioning under the control of the reed-switch detector 204. The detector simply actuates a relay 140 (FIG. 4A). If the arrangement shown in FIG. 8 is substituted for the reed-switch detector 204, it is necessary to modify the contacts of the relay 140 so that their action is reversed. That is, normally closed contacts must be substituted for normally open contacts, and vice versa. In all other respects, the two detector arrangements are interchangeable with one another, although the reed switch detector 204 has been generally found to be less sensitive to errors in the positioning of the ferrite sensor 202.

The control circuitry of the oven 100 is depicted schematically in FIGS. 4A and 4B. The paragraphs which follow present a detailed description of that control circuitry and of how it functions under the control of ferro-magnetic sensors which cooperate with the detector shown in FIGS. 5–7. Some of the lamps, switches, and the like which are depicted schematically in FIGS. 4A and 4B are also shown in other figures as well. In every case, the same reference number is used in all figures. As an example, the switch 412 which appears in the upper left-hand corner of FIG. 4A is the door-actuated switch 412 shown in FIG. 3.

In FIGS. 4A and 4B, the 230-volt supply line enters FIG 4A at the top. Busses 122, 123, and 124 convey this input power to a pair of magnetrons 101 and 102 which appear in FIG. 4B. The two magnetrons 101 and 102 generate electromagnetic energy in the form of microwaves which are conveyed through waveguides (not shown) to ports in the upper portion of the oven 100. The magnetron filaments or cathode heaters are supplied with electrical energy by a pair of transformers 103 and 104 the secondaries of which appear in FIG. 4B. The primary windings 109 and 110 of the transformers 103 and 104 appear to the right of center in FIG. 4A. Each magnetron is also supplied with high voltage that is developed by rectifier and filtering circuits 105 and 106 which are powered by a pair of transformers 107 and 108 having respective 230-volt primary windings 112 and 111.

The 230-volt supply feeds a pair of busses 113 and 114. These busses are connected by means of six normally closed interlocking switches 115 to 120 to a bus 121 and the above-mentioned bus 122. For the purpose of the present description, the switches 115 through 120 may be assumed to be always closed.

A master on-off and power level switch 125 has three positions. When the switch is positioned as shown in FIG. 4A, the oven is switched off and the input power bus 121 is disconnected from the pair of busses 123 and 124 which respectively supply power to the two magnetrons 101 and 102. When the switch 125 is vertically oriented, incoming power is supplied to both the busses 123 and 124 and, hence, both the magnetrons 101 and 102 are supplied with power. When the switch 125 is in its third position, the switch 125 supplies power only to the magnetron 101 over the bus. The oven 100 then runs at half-power. The present invention contemplates that the switch 125 will normally be left in the vertical position with power supplied to both of the busses 123 and 124.

The bus 124 is connected by means of a fuse 171 to a power switch 126 that is normally left on. The 230-volt incoming power is thus normally connected between the bus 122 and the three busses 123, 124, and 130 which are normally connected electrically to one another. However, because the switch 412 and the contacts 406A are normally open, power does not reach the central portions of the control system shown in FIG. 4A. Power also fails to reach the magnetrons, because the various switches shown connecting the busses 122, 123, and 124 to the primary windings 111 and 112 are also normally open. The microwave oven 100 is thus normally in a standby state. Before a tray can be placed into the oven 100, it is necessary to open the oven door 158. When the oven door is opened, a switch 412 (FIGS. 3 and 4A) is momentarily closed and momentarily connects the input bus 130 to a bus 127 within the control circuitry. In this manner, 230-volts is developed beyween the busses 122 and 127. This 230 volts is applied to the primary windings 109 and 110 of the magnetron filament transformers 103 and 104 and thus immediately begins to heat up the cathodes of the two magnetrons. In order to provide a convenient source of 115 volts for operating relays and the like, a pair of busses 128 and 129 are connected to center taps of the primary windings 109 and 110. As a result, closure of the switch 412 causes 115 volts to appear between the bus 127 and the busses 128 and 129.

The 115 volts across the busses 127 and 128 causes current to flow through an array of normally closed contacts 407, 408, 409, and 410A and through the coil of a relay 406. The relay 406 is thus actuated and closes the pair of contacts 406A. The contacts 406A connect the bus 130 to the bus 127 and thus keep the bus 127 connected to the input power bus 113 even after the momentary-closure switch 412 opens once again. In this manner, opening or closing the oven door 158 places the oven control system immediately into standby operation, with full power supplied to the magnetron heaters or filaments but with no microwaves being generated.

If a tray 161 is not placed into the oven chamber within one minute after the oven door 158 is opened or closed, the oven 100 automatically shuts itself off. When the detector 204 is a reed switch and senses the absence of a ferrite sensor 202 within the oven, its closed contacts actuate the relay 140. A pair of contacts 140C of the relay 140 connect the energization winding of a time-delay relay 410 across the busses 127 and 128. If the detector 204 does not sense a ferrite sensor within one minute, the time-delay relay 410 opens its contacts 410A and de-energizes the relay 406 so that the oven 100 shuts down. If a tray 161 containing a ferrite sensor 202 is placed into the oven, the detector 204 senses the ferrite sensor 202 and opens its contacts, thereby causing the relay 140 to open its contacts 140C. The time-delay relay 410 is then taken out of service and does not shut down the oven 100.

To protect the magnetrons from premature high-voltage energization without a brief warm-up interval, a second time-delay relay 132 is connected across the busses 127 and 128. A contact 132A of the time-delay relay 132 disables for ten seconds the circuitry which would otherwise place the magnetrons into operation after the switch 412 is initially closed. After the 10-second interval expires, the contacts 132A of the time-delay relay 132 close and permit the oven 100 to function in its normal manner.

To protect the oven 100 from overheating as from operating without a food load present within the oven chamber, a number of heat sensors (not shown) are arranged to open the switches 407, 408 and 409 which de-energize the relay 406. These heat sensors are simply a safety precaution and mormally have no effect upon oven operations.

In operating the oven with a reed-switch detector, the oven door 158 is opened and a tray 161 containing food items and also containing a ferrite sensor 202 is placed into the oven chamber. The oven door 158 is then closed. A pair of safety interlock switches 133 and 135 (FIGS. 1 and 4A) test to see that the oven door is securely locked so that microwave energy may not leak out. The switch 133 closes when the oven door is properly shut and enables a relay 134 to close the contacts 134A and 134B shown in FIG. 4B so as to connect the power busses 123 and 124 to the contacts 141A and 142A which are still open. The switch 135 closes when the door is properly latched and connects the bus 127 to the contacts 132A of the 10-second warmup time-delay relay 132. In FIG. 4A, the switches 133 and 135 are shown in the positions which they occupy when the oven door is securely closed.

The presence of the ferrite sensor 202 within the oven causes the reed switch detector 204 to open its contacts and de-energize the relay 140. A set of 140B of the relay 140 swing into their normal position as shown in FIG. 4A and thereby connect the bus 127 through the closed contacts 132A and 135 to one side of a pair of relays 141 and 142 which actually control the operation of the magnetrons 101 and 102. Normally, the other side of the relays 141 and 142 are connected directly to the bus 129 by the closed switch 418. Assuming for the moment that the switch 305B is closed, as would normally be the case, the relays 141 and 142 are immediately energized and cause the contacts 141A, 141B, 142A, and 142B in FIG. 4B to close. The primary windings 111 and 112 of the transformers 107 and 108 are then connected directly across the incoming 230 volt busses—122 on the right side of 4B, and 123 and 124 on the left side of FIG. 4B. High-voltage then flows to the magnetrons 101 and 102, and the magnetrons generate microwave energy at 2,450 megahertz.

When the ferrite sensor 202 within the oven 100 is heated to above its Curie-point, the detector 204 closes its contacts again and energizes the relay 140. The relay 140 throws the contacts 140B to a state opposite to that shown and thereby removes energizing power from the magnetron-control relays 141 and 142. The relays 141 and 142 respond by opening the contacts 141A, 141B, 142A, and 142B shown in FIG. 4B and thereby take the magentrons 101 and 102 out of service. The oven 100 is thus shut down when the ferrite sensor 202 is heated to above its Curie point.

When the ferrite sensor 202 cools down again to below its Curie point and regains its ferromagnetic properties, the detector 204 responds by openings its contacts and thereby de-energizing the relay 140. The relay 140 then throws its contacts 140B back onto the position shown in FIG. 4A and thereby causes the relays 141 and 142 to place the magnetrons 101 and 102 back into service generating power. In this manner, the magnetic state of the ferrite sensor 202 continues to cyclically turn the magnetrons 101 and 102 on and off so long as the ferrite sensor remains present within the oven. The first few heating intervals applied to food items within the oven in this manner heat the food items up to serving temperature, and then subsequent heating intervals simply keep the food items hot.

After the food items are heated, the oven door 158 is opened and the tray 161 containing the heated food items is removed from the oven. The act of opening the oven door throws the switches 133 and 135 to states opposite to those shown in FIG. 4A and thereby causes the relay 134 and the relays 141 and 142 to open their respective contacts in FIG. 4B and to terminate the flow of power to the magnetrons 101 and 102. When the tray and its ferrite sensor 202 are removed from the oven, the detector 204 responds to the absence of the ferrite sensor by closing its contacts and energizing the relay 140 which closes the contacts 140C. The 1-minute time-delay relay 410 shuts down the oven 100 if another tray is not inserted into the oven within 1 minute. The oven 100 is shut down regardless of whether the oven door is left open or closed.

A counter in the form of a stepping relay or switch 138 is arranged to count the successive heating intervals and to signal at the end of the second heating interval that the food items within the oven are ready to be served. The stepping relay 138 includes a forward-stepping winding 138F which is actuated by the contacts 140B each time the contacts 148B terminate the flow of energy to the magnetron-control relays 141 and 142 and thus shut down the magetrons. The stepping relay 138 is also equipped with a reverse-stepping winding 138R.

When the oven door 158 is closed after the insertion of a tray of food into the oven 100, the lever 159 momentarily closes the pair of switches 136 and 137 in sequence. The presence of a ferrite sensor 202 within the oven causes the detector 204 to de-energize the relay 140 so that a set of contacts 140A associated with the relay 140 are closed, as is shown in FIG. 4A. The switches 136 and 137 each applies a pulse to the reverse-stepping winding 138R of the stepping relay 138 and thereby steps the wiper arm of the relay 138 fully counterclockwise to the position shown in FIG. 4A.

The first contact of the relay 138 connects to a counter 139 which counts the number of times the oven 100 is used. The second contact of the relay 138 connects to the "equalizing" lamp 144. The third contact connects to the "serve" lamp 143 and to an audible indicator 145 which typically might be a buzzer or bell. At the beginning of each heating interval, the relay 138 is reset by the switches 136 and 137 and thus advances the counter 139. When the first heating interval runs to completion the contacts 140B energize the forward-stepping winding 138F of the relay 148 and cause the wiper arm of the relay 138 to advance to where it energizes the equalizing lamp 144 on the front of the oven (see FIG. 1) which then remains on during the brief non-heating interval which follows the first heating interval and during the second heating interval. At the end of the second heating interval the contacts 140B again energize the forward-stepping winding 138F and advance the wiper arm of the switch 138 to a position where it supplies power to the serve lamp 143 and also to the audible indicator 145. In this manner, there is provided both audible and visual indication that the food within the oven has been heated and is ready to serve. If the food is not removed at that time, the ferrite sensor continues to cycle the magnetrons to keep the food warm until it is removed from the oven 100.

The contacts 140A prevent the stepping relay 138 from resetting if there is no ferrite sensor 202 present within the oven 100. When no ferrite sensor is present, the detector 204 closes its contacts and causes the relay 140 to open the contacts 140A. The contacts 140A then disconnect the two switches 136 and 137 from the reverse-stepping winding 138R of the stepping relay 138 and thereby prevent the stepping relay 138 from being reset. If a food item is placed into the oven on an ordinary tray that does not include a ferrite sensor, the serve light 143 remains illuminated and the oven 100 simply does not operate.

The "heat" lamps 146 are connected across the primaries 111 and 112 of the magnetron high voltage supply transformers and are illuminated at any time when the magnetrons are functioning. One lamp is provided for each of the magnetrons, as is apparent in FIG. 4B.

There are certain types of food which can be heated too rapidly in the oven 100 if that oven is allowed to run at full power. For example, a single serving of bean soup cannot be heated as rapidly as can other food items. To prevent local overheating of such food, the preferred embodiment of the invention includes a mechanism which shuts down one of the two oven magnetrons under certain conditions. That mechanism is illustrated in the upper half of FIG. 4B and includes an 1N21B crystal diode 301 which senses the electromagnetic energy level within the oven. If the sensed level is above a predetermined value by virtue of two small a load or receipt of reflected energy, the mechanism cuts off the flow of power to the magnetron-controlling relay 142 by opening the contacts 305B. The diode 301 is simply inserted into a wall of the oven 100. The diode 301 then automatically switches one of the magnetrons out of operation at any time that the energy level within the oven rises above an acceptable level. However, some small oven loads would then be heated more slowly than necessary. In one embodiment it is, therefore, contemplated that food trays which contain items such as bean soup that are to be heated more slowly are to be equipped with a second magnetic means or its equivalent which actuates an auxiliary detector similar to the detector 204 that has been described. The auxiliary detector would then switch one of the magnetrons out of operation only when such a second magnetic means is present within the oven.

The diode 301 rectifies the signal which it senses and develops a potential across a capacitor 302 that is roughly commensurate to the size of the standing wave which the diode 301 senses within the oven. When the energy level within the oven in the vicinity of the diode 301 rises above a predetermined level, the potential developed across the capacitor 302 triggers a silicon controlled rectifier 303 which in turn energizes a D.C. relay 304. With reference to the lower-left corner of FIG. 4A, the relay 304 closes a contact 304A and causes the energization of a second relay 305. Contacts 305A of the relay 305 lock the relay 305 in its actuated state. Contacts 305B of the relay 305 disable the relay 142 which controls the operation of the magnetron 101 and thereby take the magnetron 101 completely out of service during the remainder of the current heating interval. After the small meal has been completely heated, the opening of the contacts 141B (FIG. 4B) terminates the flow of power to the relay 305 and thereby de-actuates the relay 305.

The power level sensing circuit is itself powered by a transformer 306 that derives 115 volts from the power supply busses 127 and 128. The transformer 306 develops 12 volts of alternating current across its secondary winding 307. The secondary winding 307 is connected by a diode 308 and a resistor 309 to a capacitor 310 that is connected in parallel with a Zener diode 311. The diode 311 is oriented so that a negative potential is developed across the capacitor 310. The magnitude of this potential is fixed by the Zener potential of the diode 311. A potentiometer 312 is connected across the capacitor 310, and a tap 313 on the potentiometer 312 is connected to the trigger terminal 314 of the silicon controlled rectifier 303 by the capacitor 302 that is charged by the microwave-energy-rectifying diode 301. In this manner, an adjustable negative voltage is normally applied to the trigger terminal 314 of the rectifier 303 from the tap 313 of the potentiometer 312. The diode 301 is arranged to develop a potential across the capacitor 302 in opposition to this negative potential. When the potential developed by the diode 301 across the capacitor 302 is sufficiently greater than the negative potential supplied at the tap 313 of the potentiometer 312, the trigger terminal 314 of the rectifier 303 goes positive and triggers the rectifier 303 into conduction. The power sensitivity of the power level control circuit is easily adjusted by altering the position of the tap 313 on the potentiometer 312.

When the silicon controlled rectifier 303 is once triggered into operation, current flows from the secondary winding 307 of the transformer 306, through a diode 316, a capacitor 315, a resistor 317, and the controlled rectifier 303 back to the secondary winding 307 during positive half-cycles of the alternating current input. This current tends to charge the capacitor 315 which in turn energizes the relay 304. At the end of each positive half-cycle, the potential supplied by the secondary winding 307 goes negative and terminates conduction of the silicon controlled rectifier 303. In this manner, the silicon controlled rectifier 303 is always turned off during negative supply cycles and is turned on again during positive supply cycles and when sufficient energy is present in the oven to supply a positive potential to the trigger terminal 314. The power circuit is thus self-resetting and automatically returns to its standby state when the energy level within the oven drops below a threshold level.

Operation of this power level sensing circuit may be defeated by means of a manually actuatable switch 318 that is connected in series with the primary winding of the transformer 306.

When it is desirable to heat a meal as rapidly as possible without subjecting the meal to an equalizing interval, a switch 319 (lower-center of FIG. 4A) is provided which, when thrown into the position opposite to that shown in FIG. 4A, causes the serve lamp 143 to come on immediately after the first heating of the food is completed. The switch 319 always causes the audible indicator 145 to sound after this first heating. When the switch 319 is thrown, the food is then subjected to only a single heating and the heat distribution within the food is not allowed to equalize. If the food is not removed when the serve lamp comes on, however, the food is subjected to a second heating just as though the switch 319 were never thrown.

A pair of motors 401 and 402 drive energy deflecting arms within the oven 100 which tend to break up standing waves within the oven and provide a more uniform distribution of microwave energy. A second pair of motors 403 and 404 are blower motors which provide cooling air for the magnetrons. A lamp 405 is simply a source of illumination for the oven interior.

While the control system just described is satisfactory in most respects, it may be desired to reduce the amount of energy delivered to food items within the oven during the third and subsequent heating intervals. It is contemplated that in this event the counter 138 reprograms the oven control system after the second heating interval to shorten the third and subsequent heating periods. This is done by connecting a relay or small motor in parallel with the serve lamp 143. They relay or small motor operates to modify the interior oven geometry, e.g., by pivoting an arm within the oven adjacent the ferrite sensor 202 after the second heating interval to deflect more energy toward the ferrite sensor 202 during the third and subsequent heating intervals. Alternatively, oven control during the third and subsequent heating intervals may be transferred to a simple timing mechanism which turns the oven 100 on and off cyclically under direct timer control.

It is contemplated that a separate ferrite element is attached to each tray that is used to bear food so that the ferrite element responds to the initial temperature of the food and adjusts the length of the first heating interval accordingly.

The oven 100 and its various accessories are described above in conjunction with heating of food. The same or a similar arrangement may be used to heat other types of loads. As an example, articles to be heated may comprise plastic, rubber or pharmaceutical items that are to be thawed or warmed.

While the preferred embodiment of the invention has been described in detail, it should be understood that many modifications or adaptations of the basic inventive concept will readily occur to those who are skilled in the art to which the invention pertains. It is therefore intended to encompass all such modifications and changes as fall within the true spirit of the invention in the appended claims.

It is claimed:

1. A system for heating articles comprising:

a heating structure defining a cavity to which articles to be heated and electromagnetic energy for heating the articles are supplied;

a control unit located outside said cavity for controlling the application of electromagnetic energy thereto; and a removable sensor coupled to said control unit when positioned at a predetermined location in said cavity and capable of absorbing energy at a rate which is proportional to the rate at which an article to be heated increases in temperature, so that when an article to be heated reaches a predetermined temperature said control unit terminates the application of electromagnetic energy to said cavity.

2. The system set fourth in claim 1 including:

guide means in the cavity;

an article carrier removably positioned in the cavity by said guide means; and means mounting said sensor unit on the article carrier so that said sensor is coupled to said control unit when said article carrier is positioned by said guide meame.

3. The system set forth in claim 1 in which said control unit includes a magnetically controlled switching means, and said sensor unit includes a magnetic material magnetically coupled to said switching means.

4. A system for imparting energy to comestibles comprising:

an electromagnetic oven having a cavity supplied with electromagnetic energy;

a tray carrying a number of comestible items;

guide means for locating the tray within the cavity in a given location;

an electromagnetic energy sensor carried on the tray to receive electromagnetic energy from the cavity, said sensor being capable of absorbing energy at a rate which is proportional to the rate at which an item to be heated changes in temperature from a starting temperature to a desired temperature; and a detector unit for controlling the supply of electromagnetic energy to the cavity, said detector unit being coupled to said sensor when said tray is in said given location so that when an item to be heated reaches said desired temperature said detector unit terminates the supply of electromagnetic energy to said cavity.

5. A system for heating articles comprising:

an electromagnetic energy oven having a cavity to which electromagnetic energy is supplied;

an article carrier for carrying at least one article to be heated and removably disposed in the oven;

an electromagnetic energy sensor carried on the carrier and responsive to electromagnetic energy received from the cavity;

means for detecting the presence of a sensor at a predetermined location within said cavity; and an oven control means connecting to said detecting means for controlling the heating of articles on the carrier by the oven under the control of said sensor, said control means being inhibited by said detecting means from initiating heating by the oven unless the article carrier and sensor are both in a predetermined position within the cavity.

6. A system as defined in claim 5 in which the sensor is a magnetic member and in which the detecting means and the sensor are magnetically coupled when the article carrier is in a proper position within the cavity and the initiating of heating of the oven is inhibited when the sensor is not coupled to the detecting means.

7. A system as defined in claim 6 in which the detecting means includes magnetized means magnetically coupled to the magnetic member when the article carrier is properly positioned in the cavity.

8. An automatic system for heating items varying in size using electromagnetic energy, said system comprising:

a chamber within which electromagnetic heating is to take place;

a magnetic field which, at least in part, passes through a wall of said chamber;

a sensor having ferromagnetic properties at normal temperatures and paramagnetic properties at elevated temperatures and having electromagnetic absorption properties which cause it to become hot when exposed to the electromagnetic energy that is sometimes present within said chamber;

a fixed location within said chamber where said sensor may be placed within said magnetic field whenever at least one item is to be heated in said chamber;

magnetic field strength detecting means positioned outside of said chamber adjacent said wall and within said magnetic field for generating a signal whenever the strength of the magnetic field indicates that a sensor having ferromagnetic properties is present at said fixed location; and means for supplying electromagnetic energy to the interior of said chamber under the control of said signal;

whereby said sensor, when placed into said chamber along with said item, automatically causes said means for supplying energy to heat said item for a period of time proportional to the energy absorbed by said item.

9. An automatic system in accordance with claim 8 wherein said magnetic field strength detecting means comprises a switch having magnetic contacts arranged to open and close in response to changes in the strength of the magnetic field adjacent said switch, and wherein said signal is represented by the presence or absence of current flow through said switch.

10. An automatic system in accordance with claim 9 which includes a magnetic member, and means for adjustably positioning said member relative to said switch.

11. A automatic system in accordance with claim 8 wherein said magnetic field strength detecting means comprises a magnet which also generates said static magnetic field and means for generating said signal in response to a motion of said magnet towards said fixed location.

12. An automatic system in accordance with claim 11 wherein said means for generating said signal comprises a switch arranged to be actuated by the motion of said magnet.

13. An automatic system in accordance with claim 12 wherein said switch is a mercury switch and which includes means for rotating said mercury switch in response to motion of said magnet.

14. An automatic system in accordance with claim 8 to which is added a counter means for counting the number of times said signal is generated, and signalling means controlled by said counter means for indicating when said signal is generated a predetermined number of times, but not less than twice.

15. An automatic system in accordance with claim 14 wherein said chamber has a door and wherein means are provided for resetting said counter when said door is actuated.

16. An automatic system in accordance with claim 15 wherein additional means are provided for defeating the action of said resetting means if said signal is not present when said door is actuated, thereby preventing the resetting of said counter when a sensor is not present within said chamber.

17. In an electromagnetic oven, the combination of, means defining cavity in which articles to be heated are placed;

a source of electromagnetic energy for said cavity;

an energy sensor positioned where it is exposed to the electromagnetic energy generated by said source, said sensor having ferromagnetic properties at low temperatures and paramagnetic properties at elevated temperatures, and said sensor being capable of absorbing energy at a rate which is proportional to the energy absorption of an article which is also exposed to electromagnetic energy generated by said source so that said sensor changes from a predominantly ferromagnetic state to a predominantly paramagnetic state when the article to be heated reaches a predetermined temperature;

magnetic-property detector means positioned adjacent said sensor for generating a signal whose state indicates whether said sensor is predominantly ferromagnetic or paramagnetic; and means responsive to said signal for placing said electromagnetic energy source into operation when the state of said signal indicates that said sensor is predominantly ferromagnetic and for shutting down said electromagnetic energy source when the state of said signal indicates that said sensor is predominantly paramagnetic.

18. A control system in accordance with claim 17 wherein the detector means comprises a source of magnetic field and a magnetically actuatable switch located within said field.

19. A control system in accordance with claim 17 wherein the detector means comprises a magnet, an electrical switch, a mounting for said magnet which permits sad magnet to move towards and away from said sensor, means for normally biasing said magnet away from said sensor, and means for actuating said switch in response to motion of said magnet.

20. A control system in accordance with claim 17 to which is added means for counting, means for advancing said means for counting in response to the fluctuations of said signal, and signalling means for signalling when said means for counting reaches a predetermined count.

21. A control system in accordance with claim 17 to which is added means for measuring the energy level within said heating system and means for lowering the energy level within said heating system when said measuring means signals that the energy level generated by said system is excessively high.

22. In an electromagnetic oven, the combination of:

a source of electromagnetic energy for said oven, an energy sensor capable of absorbing electromagnetic energy from a location at which the level of electromagnetic energy varies inversely with the amount of electromagnetic energy absorbed by material placed in the oven to be heated so that said sensor absorbs electromagnetic energy at a rate which is proportional to the rate at which the material to be heated changes in temperature, means including said energy sensor for developing a control signal having a first value when the energy absorbed by said sensor is below a predetermined value corresponding to a desired condition of the material to be heated and having a second value when the energy absorbed by said sensor is above said predetermined value, and oven control means controlled by said control signal for deactivating said source of electromagnetic energy when said control signal has said second value.

23. A control system in accordance with claim 22 wherein a plurality of sensors are provided, and each of said sensors changes from a predominantly ferromagnetic state to a predominantly paramagnetic state at said predetermined value of absorbed energy, whereby a fresh sensor may be placed within the oven adjacent the means for detecting each time the oven is used.

24. A control system in accordance with claim 22 wherein said oven includes an adjustable source of electromagnetic energy and means independent of said sensor for lowering the output of said source whenever the energy level within said oven rises above a predetermined threshold level.

25. A control system in accordance with claim 22 wherein said oven is designed to accept trays, wherein said oven includes an adjustable source of electromagnetic energy, and wherein said control system includes means for lowering the output of said source in response to the insertion of trays having particular properties into the oven.

26. A control system in accordance with claim 22 wherein the oven system includes a counter arranged to count fluctuations of said signal and to initiate a control action after a fixed number of fluctuations occur.

27. A control system in accordance with claim 22 wherein the oven system includes a signalling device and a counter arranged to count fluctuations of said signal and to energize said signalling device after a fixed number of fluctuations are counted.

28. A control system in accordance with claim 22 wherein said means for developing said control signal is arranged to generate said first value of control signal whenever said sensor is not positioned at said location so that said oven cannot be operated without said sensor being present.

29. In an electromagnetic oven, the combination of:

a cavity in which items to be heated are placed;

a source of electromagnetic energy for said cavity, an energy sensor-detector unit having a property which changes from a first state to a second state at a predetermined operating point, said energy sensor-detector unit being capable of absorbing energy from said source at a rate which is proportional to the rate at which an item to be heated increases in temperature, so that said sensor-detector unit changes from said first state to said second state when said item to be heated reaches a predetermined temperature;

and control means responsive to said energy sensor-detector unit for deactivating said source of electromagnetic energy when said energy sensor-detector unit changes from said first state to said second state.

30. A control system in accordance with claim 29 wherein the said property of the sensor is a temperature-dependent magnetic property, said sensor having a ferromagnetic property at lower temperatures and a paramagnetic property when heated to beyond a critical temperature level.

31. A second system in accordance with claim 30 wherein said means for detecting comprises a source of magnetic field and a field-strength-responsive signalling device both located in the vicinity of said energy sensor.

32. A control system in accordance with claim 31 wherein said signalling device comprises a reed switch having magnetically actuatable contacts.

33. In a microwave oven adapted to receive trays on which items to be heated may be placed and successively positioned within said oven, the combination of, a sensor carried by one of said trays, said sensor having a characteristic which varies from a first state to a second state in response to the absorption of a predetermined amount of electromagnetic energy, said sensor having said first state when the tray on which it is placed is initially placed in said oven, means for positioning said tray within said oven so that said sensor is at a predetermined location within said oven where it can receive electromagnetic energy, detecting means positioned to detect the presence of a sensor at said predetermined location and arranged to develop a control signal having a first value when said sensor has said first stae and a second value when said sensor has said second state, and means controlled by said control signal for supplying electromagnetic energy to said oven only during periods when said control signal has said first value.

34. The combination of claim 33, wherein said sensor is predominantly ferromagnetic when in said first state and is predominantly paramagnetic when in said second state, and said detecting means is magnetically coupled to said sensor when said tray is positioned within said oven.

35. The combination of claim 33, which includes means for counting the number of times electromagnetic energy is applied to said oven while the same sensor is positioned at said predetermined location.

36. The combination of claim 35, which includes means controlled by said counting means for producing a second control signal, and indicating means controlled by said second control signal.

37. The combination of claim 33, which includes means independent of said sensor and detecting means for developing a second signal proportional to the level of of electromagnetic energy within said oven, said level varying with the amount of energy absorbed by the food on a tray placed within said oven, and means controlled by said second control signal for controlling said electromagnetic energy supply means to reduce the level of electromagnetic energy supplied to said oven when said second signal exceeds a predetermined value.

38. The combination of claim 37, wherein said electromagnetic energy supply means normally supplies a predetermined level of electromagnetic energy to said oven, means controlled by said second control signal for reducing the level of electromagnetic energy in said oven when a tray having less than a predetermined quantity of food is placed in said oven, and means for restoring said predetermined level when a tray having more than a predetermined quantity of food is placed in said oven.

39. The combination of claim 37 which includes means for adjusting the value of said second signal at which said reduction in level of electromagnetic energy is made, thereby to adjust the quantity of food which must be present on one of said trays to cause said reduction in energy level.

40. The combination of claim 33, which includes indicating means, and means operative after a predetermined number of applications of electromagnetic energy to the items on said tray for energizing said indicating means.

41. The combination of claim 40, which includes means for energizing said indicating means in the event a tray with a sensor in said second state is placed in said oven.

42. The combination of claim 33, which includes indicating means, and means for energizing said indicating means in the event a tray without a sensor is placed in said oven.

*43. A microwave heating apparatus of the type heating an object in a heating chamber by microwaves, said apparatus comprising:*

*detection means for detecting temperature in the heating chamber, said detection means including a microwave energy-absorbing member disposed in said heating chamber for absorbing a portion of said microwaves, and a detector for detecting a temperature of said microwave energy-absorbing member, said temperature of said microwave energy-absorbing member changing dependent on the quantity of said object, thereby detecting a temperature of said object to be heated, and*

*control means for controlling the supply of microwaves to said heating chamber as a function of the detection of a predetermined temperature of said object by said detection means.*

* * * * *